Dec. 6, 1960 A. NUUT ET AL 2,963,638
POWER REGULATOR
Filed July 1, 1957 2 Sheets-Sheet 1

August Nuut
Murray J. Hillman
INVENTORS

ATTORNEY

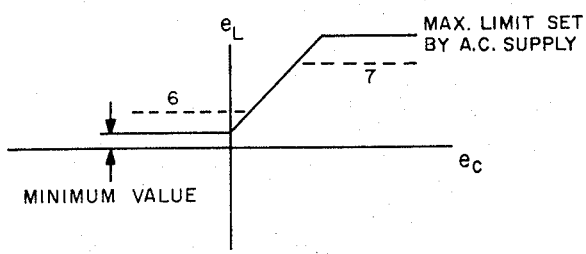
FIG. 5
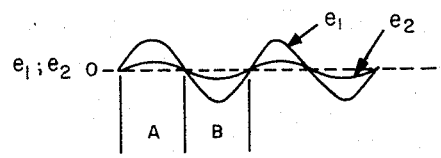
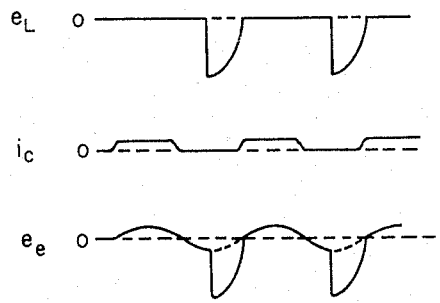
FIG. 6
August Nuut
Murray J. Hillman
INVENTORS
ATTORNEY United States Patent Office 2,963,638
Patented Dec. 6, 1960

2,963,638

POWER REGULATOR

August Nuut, Glendale, and Murray J. Hillman, West Covina, Calif., assignors to Hycon Mfg. Company, Pasadena, Calif., a corporation of Delaware Filed July 1, 1957, Ser. No. 668,964

10 Claims. (Cl. 323—22)

Our invention relates generally to power regulators and more particularly to a transistor power regulator incorporating a saturable core reactor for control of power delivered to a load.

It is an object of our invention to provide means including a power transistor and a saturable core reactor for effecting proportional control of power delivered to a load.

Another object of the invention is to provide an extremely simple circuit having high efficiency of control of delivered power.

Another object is to provide a transistor power regulator which can be controlled either by an alternating current or direct current control signal.

A further object of our invention is to provide a transistor power regulator having a large dynamic control range of output power.

Briefly, and considered in general terms, the foregoing objects are preferably accomplished by providing a saturable core reactor having a primary and a secondary winding which are supplied by respective in-phase alternating voltages, the primary winding circuit including a control transistor and a diode-connected transistor, and the secondary winding circuit including a crystal diode and a power transistor supplying a load. Another crystal diode is connected to provide a supply voltage to the collector of the power transistor, and a suitable input network is provided to apply a control signal to the control transistor. Application of the control signal to the control transistor produces a reset voltage in the primary winding which resets the saturable core reactor each cycle inversely according to the magnitude of the control signal applied. The subsequent pulse output from the saturable core reactor is variable in pulse width according to the magnitude of the applied control signal, and is applied to the power transistor to control the power delivered to the load.

Our invention possesses other objects and advantageous features, some of which, together with the foregoing, will be rendered apparent by the following detailed description of a preferred embodiment of our invention to be read in conjunction with the attached drawings, in which:

Figure 1 a circuit diagram of a preferred embodiment of our invention;

Figure 5 is a graph showing a plot for the circuit of Figure 1 of load voltage versus control voltage and the effects of variations of different circuit operating conditions; and Figure 6 is a series of graphs showing curves plotted to the same abscissa time scale and which illustrate the relationship between different voltages and currents in the circuit of Figure 1.

Figure 1:
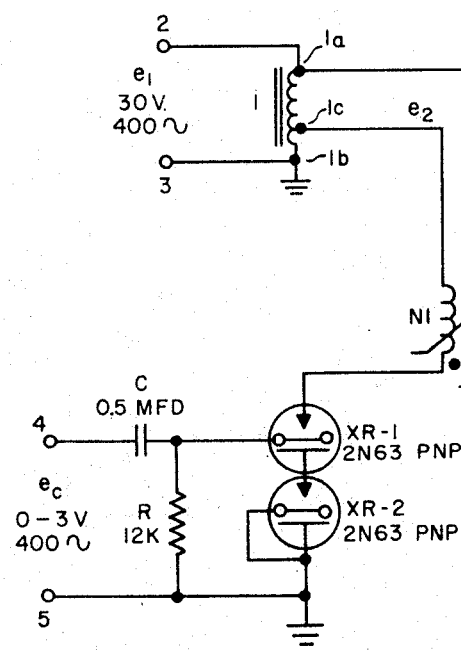

A preferred embodiment of our invention is shown in Figure 1. A 30 volt, 400 c.p.s. supply voltage $e_1$, for example, is applied across autotransformer 1 through terminals 2 and 3 which are connected to respective ends $1a$ and $1b$ of autotransformer 1. Terminal 3 (and end $1b$) is grounded as illustrated. A 3 volt tap $1c$, for example, providing a voltage $e_2$, is connected to one end of primary winding N1 of a saturable core reactor T1, the other end of primary winding N1 being connected to the emitter of control transistor XR–1. The base of transistor XR–1 is coupled to a control signal terminal 4 through a capacitor C, and the collector of transistor XR–1 is connected directly to the emitter of diode-connected transistor XR–2 which has its base and collector tied together and connected to ground. An input resistor R is connected on one end to the common junction of capacitor C and the base of transistor XR–1, and on the other end to control signal terminal 5, which is connected to ground. A control signal $e_c$ of 0–3 volts, 400 c.p.s., for example, and in phase with $e_1$ and $e_2$ can be applied between the terminals 4 and 5.

The end $1a$ of the autotransformer 1 is connected to one end of secondary winding N2 of the saturable core reactor T1 and also to the cathode of a diode CR–1, the anode of which is connected to the collector of power transistor XR–3. The base of power transistor XR–3 is connected to the anode of diode CR–2, the cathode of which is connected to the other end of secondary winding N2. The emitter of power transistor XR–3 is connected to ground through load L. The turns ratio between primary winding N1 and secondary winding N2 is 1 to 10, for example, the same as the ratio of $e_2$ to $e_1$, such that saturable core reactor T1 is insensitive to fluctuations in line voltage.

Figure 2:
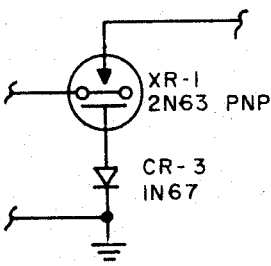
Figure 2 is a fragmentary drawing of a section of the circuit of Figure 1 illustrating the load connected in the collector circuit of the power transistor.

Although the load L is shown connected in the emitter circuit of power transistor XR–3 in Figure 1, the load L can just as well be located in the collector circuit. As indicated in Figure 2, the load L is connected between end $1a$ of autotransformer 1 (not shown here) and the cathode of diode CR–1.

Figure 3:
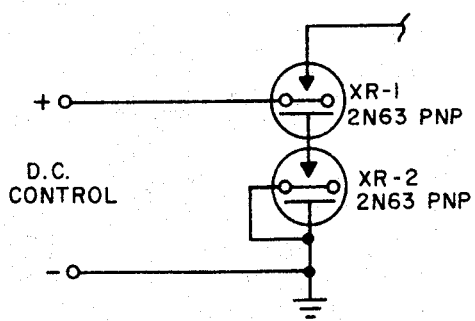
Figure 3 is a fragmentary drawing of another section of the circuit of Figure 1 showing a circuit arrangement for direct current control.

The resistor R-capacitor C input network of Figure 1 can be replaced by any of the usual coupling circuits such as transformer or reactor coupling. A direct current control is also effective and can be obtained by deleting resistor R and capacitor C, and connecting a direct current source directly between the base of control transistor XR–1 and ground. This is illustrated in Figure 3, wherein a positive direct control voltage is applied to the base of transistor XR–1. The adjustable tap of a potentiometer, for example, can be connected to the base of control transistor XR–1 and one end of the potentiometer to ground for a suitable direct current source.

Figure 4:
Figure 4 is a fragmentary drawing of yet another section of the circuit of Figure 1 illustrating the connection of a crystal diode in place of a diode-connected transistor.

The diode-connected transistor XR–2 connecting with the collector of XR–1 can, of course, be replaced by a crystal or other suitable type diode CR–3 as shown in Figure 4. Functionally, XR–2 or CR–3 prevents forward conduction through the base to collector junction of transistor XR–1, but the crystal diode CR–3 does not have as low a forward impedance as a diode-connected transistor XR–2. The function of control transistor XR–1 is to provide power gain with a voltage gain of approximately unity.

Operation of the circuit of Figure 1 can best be described with reference to Figures 5 and 6. The waveform of $e_1$ is shown as a sine wave in the top graph of Figure 6, and comprises positive half cycles A and negative half cycles B. The supply voltage $e_1$ can, however, have any other waveform, such as a square wave, for example, so long as the maximum amplitude reached is sufficient to just cause saturation of saturable core reactor T1 during the negative half cycle B, after full reset. The voltage $e_2$ is also a sine wave if $e_1$ is a sine wave, but is of a much smaller amplitude, as indicated in the top graph of Figure 6, because of the autotransformer connection at 1c.

When control signal $e_c$, which can be a sine wave in phase with $e_1$ and $e_2$, is applied between terminals 4 and 5, the positive half cycle of $e_c$ appears on the emitter of transistor XR-1 with substantially no drop in magnitude and is directed to the lower end of primary winding N1 to oppose the in-phase voltage $e_2$ applied to the other end of primary winding N1 from tap 1c. Depending upon the magnitude of $e_c$, which can be varied as desired, the difference in magnitude between $e_2$ and $e_c$ appears as a reset voltage across primary winding N1. The magnitude of this difference voltage establishes the output pulse width supplied to the load L. Diodes CR-1 and CR-2 respectively prevent application of the positive half cycle A of $e_1$ to the collector and base of power transistor XR-3. Without diode CR-2, leakage through the base of emitter junction of power transistor XR-3 during the positive half cycle A would tend to reset saturable core reactor T1, which would limit the maximum pulse width from secondary winding N2 to the base of power transistor XR-3 and consequently limiting the useful power from the power transistor XR-3.

If $e_c$ is 0, for example, a maximum reset voltage difference equal to $e_2$ resets saturable core reactor T1 to produce a minimum width pulse output during the negative half cycle B. If $e_c$ is 3 volts or equal to $e_2$, no difference voltage is available for reset purposes, and a maximum width pulse output is obtained in the following negative half cycle. A substantially constant reset current $i_c$ of approximately one milliampere, for example, flows in primary winding N1 during the positive half cycle A. This is illustrated by the curve in the second graph from the bottom of Figure 6.

During the negative half cycle B, a negative half cycle of $e_c$ is applied to the base of control transistor XR-1. At the same time, however, a negative half cycle of in-phase voltage $e_2$ appears at the emitter of XR-1 through primary winding N1. Normally, a negative emitter transistor is effectively reverse-biased, however, the emitter and collector of a transistor can be functionally interchanged such that transistor XR-1 would conduct but for the inclusion of diode-connected transistor XR-2. Diode-connected transistor XR-2 has a very low forward resistance which permits full resetting of T1 since the total voltage drop across control transistor XR-1 and diode-connected transistor XR-2 is very low. Ordinary crystal diodes cannot match this requirement. The voltage waveform $e_e$ from the emitter of control transistor XR-1 to ground is shown by the curve in the bottom graph of Figure 6.

During the negative half cycle of $e_2$, the large negative half cycle of $e_1$ is also applied to the base of power transistor XR-3 through secondary winding N2 and diode CR-2. A small magnetizing current of about 100 microamperes initially flows in secondary winding N2 as a result, before saturation of saturable core reactor T1 occurs. This is shown exaggerated by the curve in the second graph from the top of Figure 6. The base current $i_B$ of the power transistor increases suddenly as saturable core reactor T1 saturates, as indicated by the sharp drop following the exaggerated magnetizing current portion. The voltage $e_L$ waveform across load L generally follows that of the base current of power transistor XR-3, as illustrated by the curve in the middle graph of Figure 6, which is for a resistive load.

The time or the quickness that saturable core reactor T1 saturates during the negative half cycle B is dependent upon the previous reset voltage magnitude applied during the positive half cycle A and which is, in turn, dependent upon the applied magnitude of the in-phase control signal $e_c$. The wider the output pulse, the greater will be the power delivered to the load. The ratio or proportion of on-to-off time of the power transistor serves to effect proportional control of power delivered to the load according to the magnitude of a small control signal $e_c$. Thus, an adjustable magnitude control signal is used to regulate the output pulse width of periodic pulses, and hence the power delivered to a load.

A plot of load voltage $e_L$ versus the control signal $e_c$ is shown in Figure 5. The effect of excessive magnetizing current in secondary winding N2 on the minimum value of load voltage $e_L$ is to raise the minimum level as indicated by the broken line 6. Excessive impedance in the control circuit, such as would be introduced by substitution of a high impedance crystal diode for diode-connected transistor XR-2, will also cause this effect since insufficient reset voltage is applied across primary winding N1. However, if primary winding N1 had many turns, like the secondary winding N2 which is designed for a high supply voltage, leakage current through control transistor XR-1 would tend to over reset the saturable core reactor T1 and restrict the maximum output to a value less than the maximum limit value imposed by the alternating supply voltage. This effect of undesired reset during the positive half cycle A on the maximum output limit is, for example, indicated by the broken line 7 in Figure 5.

In order to obtain a maximum ratio between the maximum and minimum pulse widths derivable from the output of saturable core reactor T1, the saturable core reactor T1 must have the following characteristics to prevent the magnetizing current from prematurely turning on power transistor XR-3 each cycle.

(1) The core material for saturable core reactor T1 must yield the narrowest possible hysteresis loop to keep the magnetizing current from making unduly large excursions in a cycle.

(2) The core itself must be as small as possible consistent with the driving power requirements of the power transistor XR-3. This effectively reduces the reluctance of the magnetic path to a minimum and the required magnetizing current can be kept low.

(3) For a given size core, the highest practicable supply voltage $e_1$ is required. This necessitates the use of a maximum number of turns for the secondary winding N2 and therefore further reduces the magnetizing current flowing during the portion of the negative half cycle B before the saturable core reactor T1 saturates. On the other hand, the primary winding N1 should have the smallest number of turns for low impedance consistent with the minimum voltage drops across control transistor XR-1 and diode-connected transistor XR-3.

Control effected by a direct voltage applied to the base of control transistor XR-1 as shown in Figure 3 is similar in operation to control by an alternating current control signal which is in phase with the supply voltages $e_1$ and $e_2$. During the positive half cycle A, a reset voltage is produced across primary winding N1 which is dependent upon the magnitude of the positive direct current control signal applied to the base of control transistor XR-1, as with alternating current control. During the negative half cycle B, the emitter of control transistor XR-1 is negatively biased as well as having a positive signal applied to its base, which prevents conduction. Diode-connected transistor XR-2 prevents forward conduction through the base to collector junction of control transistor XR-1, when the emitter is negative.

A highly satisfactory transistor power regulator is provided by a circuit having component values as shown in the drawings. While specific values and types of components are given, these have been noted as examples only, and are not intended to restrict the breadth and scope of our present invention.

It is to be understood that the particular embodiment of our invention described above and shown in the draw-

We claim:

1. A power regulator, comprising: a saturable core reactor having a primary winding and a secondary winding; a first source of alternating voltage connected to energize one end of the primary winding; a control semiconductive device; an input network for applying an adjustable magnitude control signal to said control semiconductive device, an output voltage being obtained therefrom according to the magnitude of the control signal and applied to the other end of the primary winding, the difference in magnitude between the alternating voltage of said first source and the output voltage from said control semiconductive device appearing as a reset voltage across the primary winding for resetting said saturable core reactor during a conductive interval for said control semiconductive device; a power semiconductive device for driving a load when energized; a second source of alternating voltage, the secondary winding connecting said second source to said power semiconductive device for energizing the same and driving the load when said saturable core reactor saturates, said saturable core reactor saturating during a non-conductive interval for said control semiconductive device according to the magnitude of the reset voltage previously applied to the primary winding, whereby power delivered by said power semiconductive device to the load varies according to the reset of said saturable core reactor and the magnitude of the control signal.

2. A transistor power regulator, comprising: a saturable core reactor having a primary winding and a secondary winding; a control transistor having a base, emitter and collector, the emitter of said control transistor being connected to one end of the primary winding; a first source of alternating voltage connecting the collector of said control transistor to the other end of the primary winding; an input network for applying a control signal to the base of said control transistor for producing an output voltage on the emitter of said control transistor according to the magnitude of the control signal, a reset voltage of magnitude equal to the difference in magnitude between the alternating voltage of said first source and the output voltage on the emitter of said control transistor being developed across the primary winding for resetting said saturable core reactor during a conductive interval for said control transistor; a power transistor having a base, emitter and collector, the base of said power transistor being connected to one end of the secondary winding and the collector of said power transistor being connected to the other end of the secondary winding; a second source of alternating voltage having an output voltage in phase with the output voltage of said first source, said second source being connected on one end to the collector of said power transistor and the other end of the secondary winding; and a load connecting the emitter of said power transistor to the other end of said second source, the alternating voltage of said second source being applied to the base of said power transistor and energizing the same on saturation of said saturable core reactor occurring during a non-conductive interval for said control transistor and according to the magnitude of the reset voltage previously developed across the primary winding, whereby power delivered by said power transistor to said load varies according to the reset of said saturable core reactor and the magnitude of the control signal.

3. The invention according to claim 2 wherein said load is connected in the collector circuit of said power transistor and the emitter of said power transistor is connected directly to the other end of said second source of alternating voltage.

4. The invention according to claim 2 wherein said input network includes a resistance-capacitance coupling circuit, and the control signal is an alternating voltage which is in phase with the output voltages of said first and second sources.

5. The invention according to claim 2 wherein said control signal is a direct current control signal.

6. The invention according to claim 2 wherein said first and second sources of alternating voltages include an autotransformer having output voltage taps for providing in-phase alternating voltages of different magnitudes.

7. The invention according to claim 2 including, in addition, unidirectional conducting means connecting the base of said power transistor to the one end of the secondary winding, for preventing leakage through said power transistor.

8. The invention according to claim 2 including, in addition, unidirectional conducting means for connecting the collector of said power transistor to the one end of said second source of alternating voltage, for preventing reversed conduction through said power transistor when the emitter and collector of said power transistor are functionally interchangeable.

9. The invention according to claim 2 including, in addition, unidirectional conducting means for connecting the collector of said control transistor to said first source of alternating voltage, for preventing reversed conduction through said control transistor when the emitter and collector of said control transistor are functionally interchangeable.

10. The invention according to claim 9 wherein said unidirectional conducting means is a diode-connected transistor.

References Cited in the file of this patent

UNITED STATES PATENTS

| | | |
|---|---|---|
| 2,569,345 | Shea | Sept. 25, 1951 |
| 2,760,088 | Pittman et al. | Aug. 21, 1956 |
| 2,808,990 | Van Allen | Oct. 8, 1957 |
| 2,809,303 | Collins | Oct. 8, 1957 |
| 2,809,343 | Pittman | Oct. 8, 1957 |

FOREIGN PATENTS

| | | |
|---|---|---|
| 167,294 | Australia | Mar. 21, 1956 |

OTHER REFERENCES

Naval Research Laboratory Report 3869, "On the Control of Magnetic Amplifiers," by R. A. Ramey, Oct. 24, 1951, pages 1–9.